US 6,655,693 B2

(12) United States Patent
Hosanna et al.

(10) Patent No.: US 6,655,693 B2
(45) Date of Patent: Dec. 2, 2003

(54) NON-CONTACTING GAS COMPRESSOR SEAL

(75) Inventors: Rich Hosanna, Gurnee, IL (US); Joseph Savio, Des Plaines, IL (US); Alan D. Baureis, Hoffman Estates, IL (US)

(73) Assignee: John Crane Inc., Morton Grove, IL (US)

( * ) Notice: Subject to any disclaimer, the term of this patent is extended or adjusted under 35 U.S.C. 154(b) by 24 days.

(21) Appl. No.: 09/842,501

(22) Filed: Apr. 26, 2001

(65) Prior Publication Data

US 2002/0158416 A1 Oct. 31, 2002

(51) Int. Cl.[7] ................................. F16J 15/34
(52) U.S. Cl. .................. 277/358; 277/369; 277/399; 277/400
(58) Field of Search .................. 277/358, 361, 277/369, 370, 372, 375, 390, 394, 397, 366, 367, 368, 399, 400, 408

(56) References Cited

U.S. PATENT DOCUMENTS

| | | | |
|---|---|---|---|
| 2,939,730 A | | 6/1960 | Turpin |
| 3,109,658 A | | 11/1963 | Barrett |
| 4,212,475 A | | 7/1980 | Sedy |
| 4,889,350 A | | 12/1989 | Tranter |
| 5,071,318 A | * | 12/1991 | Bice et al. ............... 277/390 |
| 5,201,531 A | | 4/1993 | Lai |
| 5,368,314 A | * | 11/1994 | Victor et al. ............. 277/400 |
| 5,375,853 A | | 12/1994 | Wasser |
| 5,421,593 A | * | 6/1995 | Aritsubo et al. .......... 277/361 |
| 5,435,574 A | | 7/1995 | Victor |
| 5,490,679 A | * | 2/1996 | Borrino et al. ........... 277/369 |
| 5,496,047 A | * | 3/1996 | Goldswain et al. ....... 277/400 |
| 5,560,622 A | * | 10/1996 | Sedy ....................... 277/390 |
| 5,571,268 A | * | 11/1996 | Azibert .................... 277/370 |
| 5,617,879 A | * | 4/1997 | Kubala .................... 277/398 |
| 5,681,047 A | * | 10/1997 | Klostermann et al. .... 277/400 |
| 5,713,576 A | | 2/1998 | Wasser et al. |
| 5,938,206 A | | 8/1999 | Klostermann et al. |
| 6,109,617 A | * | 8/2000 | Laney ...................... 277/369 |
| 6,152,452 A | * | 11/2000 | Wang ...................... 277/399 |
| 6,210,107 B1 | * | 4/2001 | Volden et al. ............ 277/408 |

FOREIGN PATENT DOCUMENTS

CA  644840  7/1962

OTHER PUBLICATIONS

JohnCrane Type 28AT Dry–Running Non–Contacting Gas Seal, Bulletin S–3030, 1993.
John Crane Type 2800 Worlds First Non–Contacting Pump Seal, Bulletin B–2800–A, B–2800–e, Oct., 1994.
Pumps & Systems Rotating Equipment Magazine, A Randall Publication, Jan. 2001.
(PPC Mechanical Seals, 7000G Non–Contacting Gas Lift–Off Seal).
(PPC Mechanical Seals, PPC 7000G Gas Seals).

* cited by examiner

Primary Examiner—Anthony Knight
Assistant Examiner—Vishal Patel
(74) Attorney, Agent, or Firm—Jenner & Block, LLC (57) ABSTRACT

A non-contacting gas compressor seal assembly is disclosed with an intermediate buffer chamber. The process gas is corrosive or otherwise hazardous and is contained from entering the atmosphere by pumping the barrier gas toward the process fluid. The inboard seal of the assembly is designed to maintain a sealing relationship in the event of loss of buffer gas pressure by operating as a non-contacting seal on the process fluid.

45 Claims, 3 Drawing Sheets

FIG. 1.

NON-CONTACTING GAS COMPRESSOR SEAL

BACKGROUND OF THE INVENTION

Non-contacting seals are successfully employed in gas compressors to provide a seal against loss of process gas. Such a seal is shown, for example, in U.S. Pat. No. 4,212,475 to Sedy.

In practice, non-contacting seals are often arranged in an assembly having two spaced apart sets of relatively rotating rings which, in some applications, define an intermediate chamber containing a pressurized barrier gas. The seal ring sets each include a mating ring and an axially movable primary ring. Grooves formed on the face of one of the rings of each set communicate with the barrier gas. One seal set pumps gas from the buffer chamber toward the process fluid. The other pumps toward the atmosphere. An example of such a seal is the double Type 28 gas compressor seal manufactured by John Crane Inc., Morton Grove, Ill.

Gas compressor seals of the type described are configured such that on loss of buffer or barrier gas, the inboard seal opens and defines a leakage path to the intermediate chamber. The outboard pair of seal rings operates as a non-contacting seal and pumps a controlled amount of the process gas between the faces. However, since loss of buffer gas often results from failure of the outboard seal, opening of the faces of the inboard seal could cause undesirable leakage through the buffer chamber to atmosphere.

Non-contacting seals that operate on a film of gas have more recently been employed to seal liquid in pump applications. An example is found in U.S. Pat. No. 5,375,853. There, spaced seal sets define a buffer chamber for gas at a pressure higher than the process. The inboard seal set pumps the gaseous barrier across the relatively rotatable faces toward the process fluid. The outboard set pumps the barrier gas toward the atmosphere. John Crane Inc. manufactures and sells such a seal arrangement for pumps under the designation T-2800.

In pump applications, the inboard seal set is configured such that on loss of buffer pressure the inboard seal closes and operates as a contacting seal sufficiently long to permit shut-down of the pump. Such an arrangement would not be feasible in the gas compressor environment because the resulting face contact could affect structural integrity.

It has been determined, however, that in gas compressor and similar applications, the process fluid can effectively be contained upon a pressure reversal if the inboard seal ring set were arranged to continue to operate as a non-contacting seal with the process fluid providing the requisite lift. In this way only a small, controlled quantity of process gas would pass to the buffer chamber, thereby, minimizing loss to atmosphere. The present invention is directed to a seal assembly arranged to provide this capability.

SUMMARY OF THE INVENTION

The present invention provides a non-contacting seal arrangement between a housing and relatively rotatable shaft to contain a process fluid in the housing which, on loss of barrier fluid pressure, the inboard seal continues to operate as a non-contacting seal. The seal arrangement includes a pair of spaced sets of relatively rotating rings defining an intermediate chamber to receive a barrier gas at a pressure exceeding process fluid pressure. Each set includes a non-rotatable ring and a rotatable ring, one of the rings being movable axially relative to the other. Each ring of each set defines a generally radial annular sealing face in relatively rotating sealing relation to the sealing face of the other ring of the set at a sealing interface. One of the rings of at least one set has a pumping mechanism thereon arranged to pump barrier gas from the intermediate chamber between the interface. That set is adapted to be disposed to pump barrier gas toward the process fluid in the housing. The pumping mechanism of the ring is further configured to pump process fluid between the interface toward the intermediate chamber when the process fluid pressure exceeds the pressure of the barrier gas.

More particularly, the invention may include a retainer to support the axially movable ring of the set disposed to pump barrier gas toward the process fluid. The retainer and ring define an axially elongated annular pocket. An O-ring seal is disposed in the pocket and provides a secondary seal between the retainer and the ring. It is sized such that it has a cross-sectional diameter that is smaller than both the axial and radial extent of the pocket.

The axially movable ring of the seal set disposed to pump barrier fluid toward the process may include a first portion defining the radially directed sealing face, a second portion supporting the ring for axial movement, and an intermediate portion configured to decouple said first and second portions to ensure a parallel relationship between the relatively rotating sealing faces under varying conditions of operating pressure and temperature.

The invention further contemplates the method of sealing using the seal assembly comprising providing a barrier gas in the intermediate chamber at a pressure in excess of the pressure of said process fluid, pumping barrier gas from the intermediate chamber between the interface toward the process fluid when the pressure of the barrier gas exceeds the pressure of the process fluid, and pumping process fluid between the interface toward the intermediate chamber when the process fluid pressure exceeds the pressure of the barrier gas.

DETAILED DESCRIPTION

Figure 1:
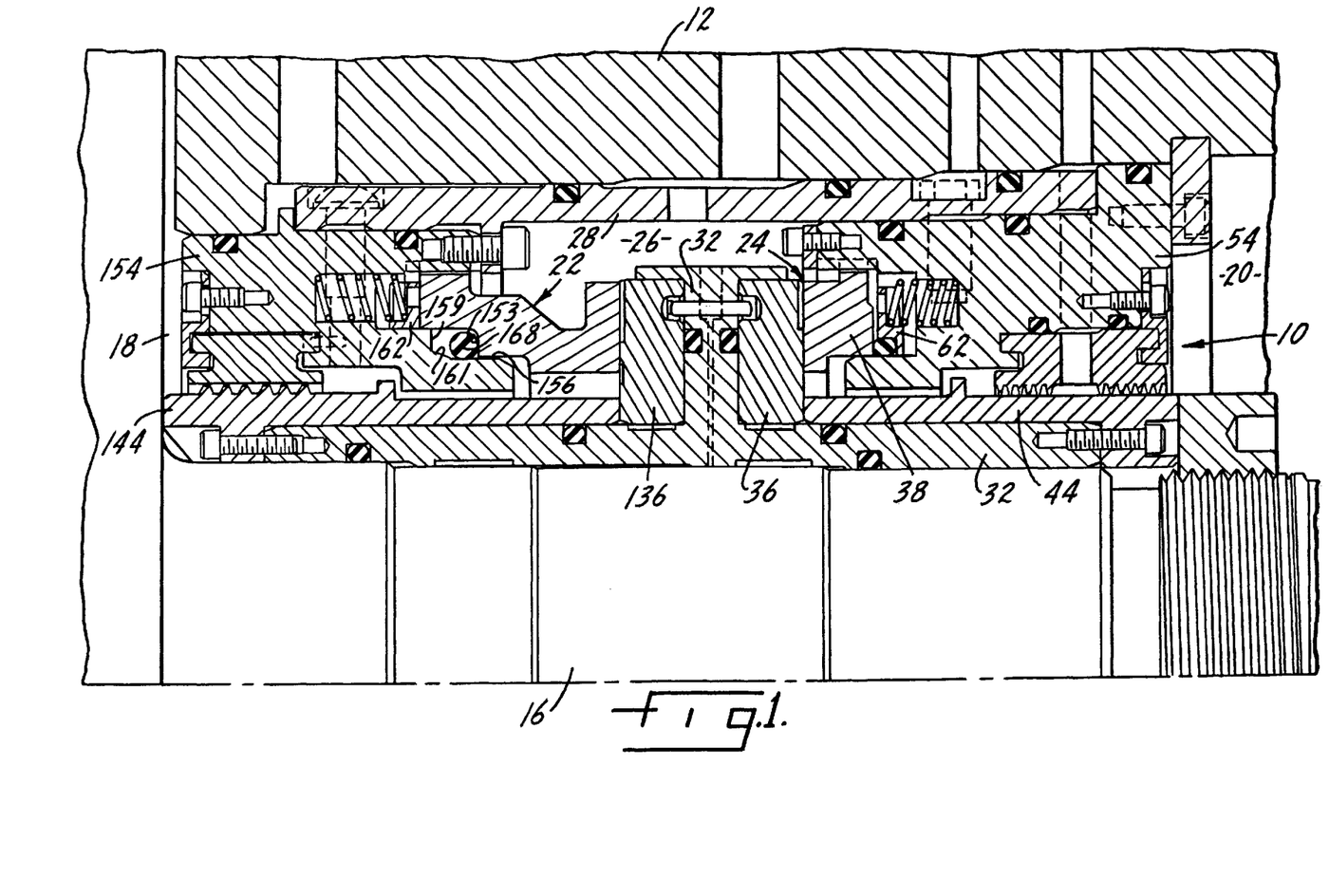
FIG. 1 is a cross-sectional elevational view of an embodiment of a seal assembly illustrative of the present invention.
Figure 4:
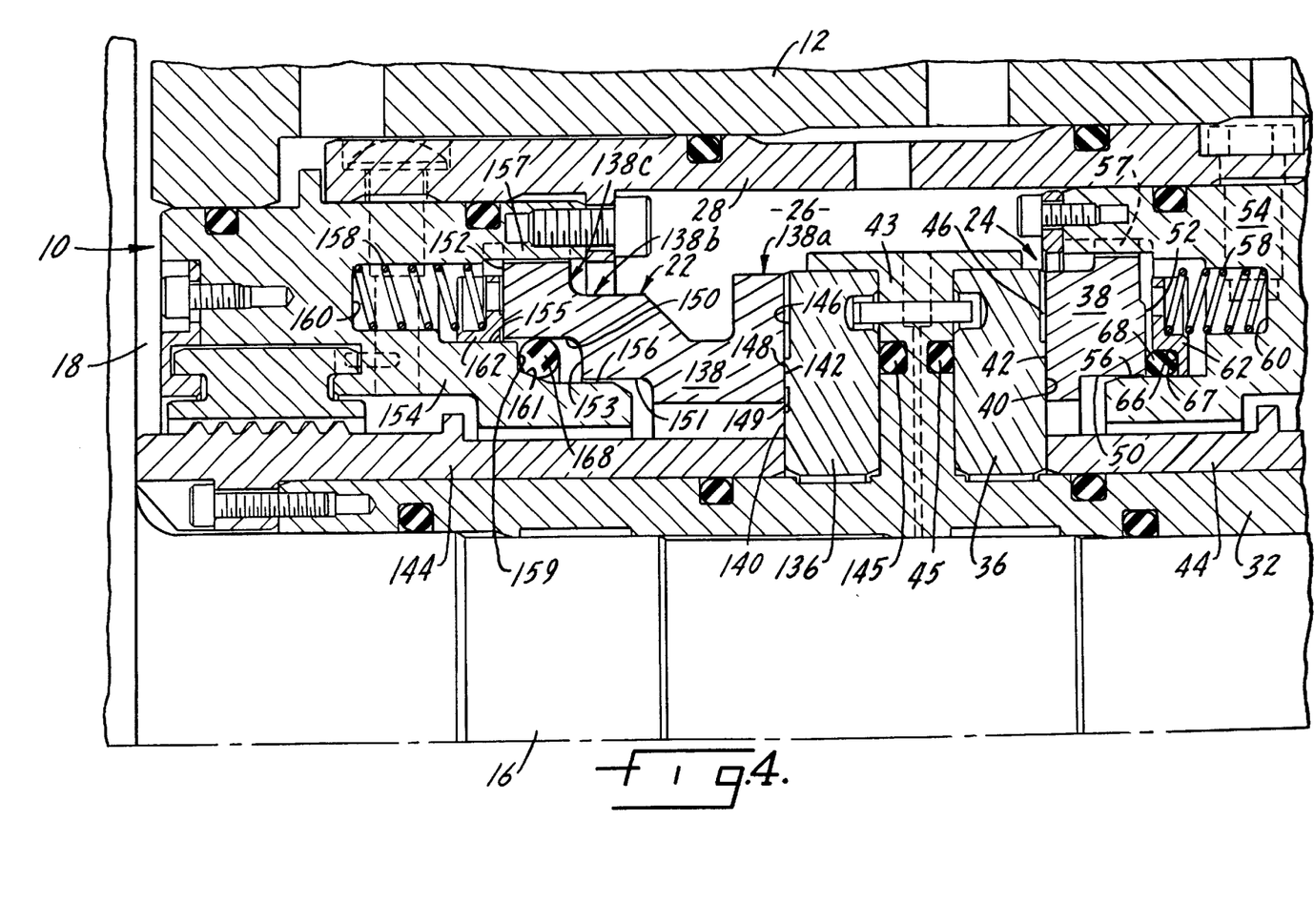
FIG. 4 is a sectional view of the inboard seal set of the apparatus of FIG. 1, showing a different operational mode.

FIGS. 1 and 4 illustrate a dual, non contacting seal assembly generally designated 10 illustrative of the principles of the present invention. It is operatively positioned between a housing 12 of a piece of turbomachinery equipment such as a gas compressor and its rotatable shaft 16. Housing 12 defines an inner chamber containing process fluid pressurized by the operation of the compressor. The seal assembly 10 contains the gas from passage between the shaft 16 and housing 12 to the surrounding environment.

The embodiment shown is illustrative of the principles of the invention, but is not to be considered limiting. The invention could be applied to seal assemblies having, for example, rotating seal heads. It is further contemplated that the invention could be employed in a single non-contacting seal configuration or in an assembly including both a non-contacting and a contacting seal. Also, it is contemplated that the invention could be employed to seal a process fluid such as a high vapor pressure liquid such as liquid propane or the like.

The seal assembly 10 is a dual seal arrangement comprised of an inboard seal ring set 22 adjacent to the process gas chamber 18 and an outboard seal ring set 24 adjacent the ambient environment 20 external to housing 12. The seal ring sets 22 and 24 define an intermediate buffer or barrier fluid chamber 26 that contains a buffer gas such as nitrogen, which is inert to the process gas. The barrier gas is normally maintained at a pressure exceeding the process gas pressure. Chamber 26 is defined by liner 28 which is fixed to housing 12 and attaches the non-rotating elements of the seal assembly to the housing 12. Sleeve assembly 32 surrounds shaft 16 and secures the rotating components to the shaft.

Outboard seal ring set 24 includes a rotating seal ring 36 and a stationary seal ring 38. Ring 38 is axially movable to accommodate axial translation of the shaft 16 and associated sleeve 32 during compressor operation. Such movement could be as much as one-sixteenth of an inch or more in either axial direction from the nominal position.

Seal ring 36 defines an annular generally radial seal face 40 in relatively rotatable sealing relation with an annular, generally radial sealing face 42 of ring 38.

Rotating sealing ring 36, referred to as the mating ring, is secured to sleeve 32 by collar 44. It is axially fixed relative to the shaft 16. An O-ring 45 provides a secondary seal between a back face of ring 36 and an adjacent radial surface formed on radial extension 43 of sleeve 32.

Face 40 of mating ring 36 includes a pattern of depressions and lands forming a pumping mechanism to pump barrier fluid from chamber 26 between the faces toward the surrounding environment. A preferred pumping mechanism is a series of spiral grooves 46 best seen in FIG. 2. These grooves and lands commence at the radially outer circumferential edge of the interface between the faces 40–42 and are open to the chamber 26. They extend toward an ungrooved area or dam 48 adjacent the radially inner circumferential edge of the interface. During operation, pumping of the barrier gas between the interface 40–42 creates lift to separate these faces for non-contacting performance.

Seal ring 38, usually referred to as the primary ring, includes an inner cylindrical surface 50. It also has a series of drive grooves about its outer periphery and has a radial back face 52.

Seal ring 38 is supported on a retainer 54, which is fixed to housing liner 28. Retainer 54 defines an outer cylindrical surface 56 of a diameter slightly smaller than inner cylindrical surface 50 of ring 38. This relationship permits axial translation of ring 38.

The ring 38 is held against rotation by interengagement of one or more drive lugs 57 on retainer 54 with the drive grooves formed about outer diameter of ring 38. This relationship is such as to preclude rotation of ring 38 but permit axial movement.

A series of axially directed compression coil springs 58 are positioned in pockets 60 formed in retainer 54. A spring disc 62 is disposed between springs 58 and rear face 52 of the primary ring 38. The disc 62 receives the axial force imparted by the springs 58, to urge it toward the rear face 52 of the primary ring 38.

Disc 62 forms a pocket adjacent rear face 52 of primary ring 38. The pocket includes an axial surface 66 and a radial surface 67 which define an O-ring receptacle. O-ring 68 is disposed in the pocket. It is compressed between radial surface 67 of disc 62 and back radial face 52 of the primary ring 38. It provides a secondary seal to preclude passage of gas between the back of ring 38 and disc 62. The O-ring 68 is sized to contact outer cylindrical surface 56 of retainer 54 but permit axial movement of the primary ring 38, disc 62 and O-ring 68 to accommodate axial translation of shaft 16 relative to housing 12.

Inboard seal ring set 22 includes a rotating seal ring 136 and a stationary seal ring 138. Ring 138 is axially movable to accommodate axial translation of shaft 16 and associated sleeve 32.

Seal ring 136 defines an annular, generally radial seal face 140 in relatively rotatable sealing relation with annular, generally radial sealing face 142 of ring 138.

Rotating sealing ring 136 is secured to sleeve 32 by collar 144. It is axially fixed relative to the shaft 16. An O-ring 145 provides a secondary seal between a back face of ring 136 and an adjacent radial surface formed on radial extension 43 of sleeve 32.

Face 140 of mating ring 136 includes a pattern of depressions and lands forming a pumping mechanism to pump barrier fluid from chamber 26 between the faces toward the process gas. Best seen in FIG. 3, the preferred pumping mechanism is a radially outer pattern of spaced spiral grooves 146 and associated lands 147. The grooves are open to the chamber 26 and extend radially inward toward an ungrooved area or dam 148. During operation, pumping of the barrier gas between the interface 140–142 to process chamber 18 creates the requisite lift to separate these faces for non-contacting performance.

Figures 2, 3:
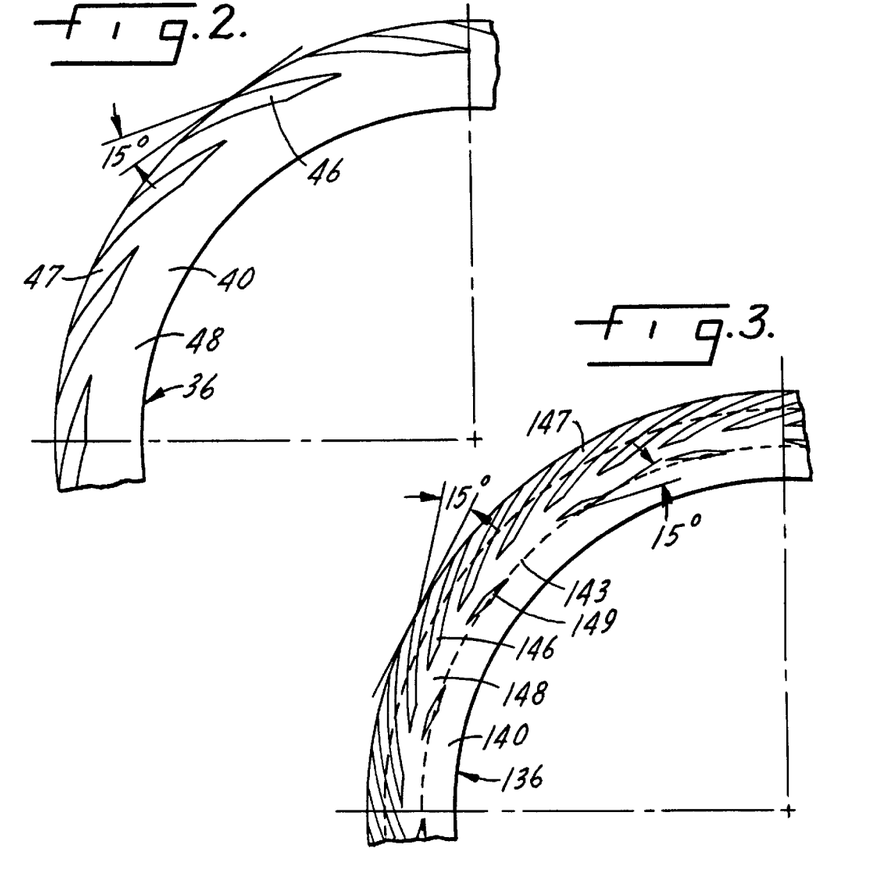
FIG. 2 is a fragmentary plan view of the mating ring face of the outboard seal set of the apparatus of FIG. 1.
FIG. 3 is a fragmentary plan view of the mating ring face of the inboard seal set of the apparatus of FIG. 1.

Referring to FIG. 3, for clarity the radial extent and position of the interface between face 140 of mating ring 136 and face 142 of primary ring 138 is illustrated by dashed lines. The groove and land pattern 146–147 commences at the outer circumferential periphery of mating ring 136 and extends inwardly toward the process chamber 18. The pattern terminates short of the inner circumferential periphery of the interface 140–142 to define dam 148.

The face pattern of grooves described above with respect to the mating ring 136 of inboard seal ring set 22 is commonly used in gas compressor seals such as the T-28 double seal manufactured by John Crane Inc. The pattern of the grooves 46 and lands 47 on the face 40 of mating ring 36 of outboard seal ring set 24 would be essentially the same spiral groove and land pattern. However, the angle of spiral is in the opposite direction of that formed on ring 136.

In accordance with the present invention, the pumping mechanism formed on radial face 140 of mating ring 136 includes a pattern of radially inner spiral grooves 149 separated by associated ungrooved lands 143. These grooves communicate with the process fluid in chamber 18 and extend radially outwardly from the inner circumferential periphery of interface 140–142 toward the radial inward terminus of spiral grooves 146. The grooves 149 terminate short of the radially inner terminus of grooves 146. The land between these groove patterns defines a continuous ungrooved annular dam 148.

The spiral grooves 149 are angled oppositely from the grooves 146. They, therefore, are arranged to pump from the process chamber 18 toward the intermediate or barrier gas chamber 26. The grooves 146 and lands 147 are equal in circumferential extent. The grooves 149 have a circumferential extent of one half the circumferential extent of each associated land. The spiral grooves 146 and associated lands 147 span about 55–60% of the radial extent of the interface 140–142, preferably about 58%. The spiral grooves 149 and associated lands 143 span about 10 to 15%, preferably about 13%, of the radial extent of the interface. The intermediate dam spans the remainder.

The grooves 149 are also shallower than the grooves 146. Grooves 146 have a depth of about 0.0005 inches. Grooves 149 have a depth of about 0.0002 inches. The grooves are at an angle of 15° to a tangent to the circumference from which they extend. The radially inner tip of each groove 149 is aligned on a radial line with the radially inner tip of every other groove 146.

Seal ring 138 is axially elongated as compared to seal ring 38 of outboard seal set 24. It includes a first inner cylindrical surface 150 and a second inner cylindrical surface 151 which is of a diameter smaller than first inner cylindrical surface 150. A radial sealing surface 153 extends from second inner cylindrical surface 151 and joins first inner cylindrical surface 150 with a radius or fillet. Ring 138 also has a series of drive grooves about its outer periphery and a radial back face 152.

Primary ring 138 is a unitary component made from a single blank of material. As best understood with reference to FIG. 5, ring 138 is configured to decouple an outboard end portion 138a, which defines radial face 142 from an inboard end portion 138c which supports the ring in the assembly 10. An intermediate portion 138b connects the end portions 138a and 138c. This configuration permits the radial faces 140 and 142 to remain essentially parallel over the range of pressures and temperatures experienced during operation.

Seal ring 138 is supported on a retainer 154 fixed to housing 12 by liner 28. Retainer 154 defines a first outer cylindrical surface 155 supporting surface 150. It is of a diameter slightly smaller than the first inner cylindrical surface 150. Retainer 154 includes a second outer cylindrical surface 156 supporting surface 151 of ring 138. It is of a diameter smaller than the second inner cylindrical surface 151 of ring 138. This relationship permits axial translation of ring 138 relative to retainer 154.

A radial sealing surface 159 extends radially inwardly from first outer cylindrical surface 155 and joins second outer cylindrical surface 156 at axially extending conical ramp 161. Ramp 161 extends radially outwardly at a 20° angle to the horizontal from its intersection with second outer cylindrical surface 156 to its joinder with radial sealing surface 159.

The ring 138 is held against rotation by interengagement of one or more drive lugs 157 on retainer 154 with drive grooves formed about outer diameter of ring 138. This relationship is such as to preclude rotation of ring 138 but permit axial movement.

A series of axially directed compression coil springs 158 are positioned in pockets 160 formed in retainer 154. A spring disc 162 is disposed between springs 158 and rear face 152 of the primary ring 138. The disc 162 receives the axial force imparted by the springs 158 and transfers it to a rear face 152 of primary ring 138.

A secondary seal in the form of an O-ring 168 prevents passage of gas between retainer 154 and primary ring 138. The first inner cylindrical surface 150 of primary ring 138, and radial sealing surface 153 of primary ring 138, second outer cylindrical surface 156 of retainer 154, conical ramp 161 and radial sealing surface 159 of retainer 154 define an axially elongate annular O-ring pocket surrounding secondary seal O-ring 168. The pocket has an axial extent between radial sealing surface 153 of ring 138 and radial sealing surface 159 of retainer 154 that exceeds the cross-sectional diameter of the O-ring. The ring 168 is, therefore, free to move axially within the pocket as the shaft 16 translates axially relative to housing 12. First inner cylindrical surface 150 of ring 138 overlies second outer cylindrical surface 156 of retainer 154. These surfaces define the radial extent of the annular pocket.

O-ring 168 is sized to define an inner peripheral surface that slightly contacts second outer cylindrical surface 156 of retainer 154. As illustrated in FIG. 1, at ambient design temperature of 70° F. (Fahrenheit), it has cross-sectional diameter such that the outer peripheral surface is slightly spaced from first inner cylindrical surface 150 of primary ring 138. This relationship of the cross-sectional diameter of the O-ring 168 to the radial extent of the O-ring seal pocket results from the need to accommodate axial translation of the primary ring 138 under all conditions of elevated operating temperature.

Complication arises from the different rates of thermal expansion of the materials used in the various seal components. Typically, the mating rings 36 and 136 are silicon carbide or tungsten carbide. The primary rings 38 and 138 are carbon. The secondary seal O-rings 68 and 168 and other O-ring seals are a polymeric material such as Kalrez, a fluoroelastomer manufactured by E.I. duPont & Company. Other fluoroelastomers could be used, depending on compressor operating temperatures. The remaining metal parts, such as retainers 54 and 154, are stainless steel, such as 410 stainless or Hastelloy C.

Operating temperatures range from ambient, which, for design purposes, is 70° F. or higher. At operating temperatures, about 325° F., the radial extent of the O-ring pocket is smaller than it is at ambient or other temperatures below operation. A cross-section of O-ring 168, sized to fit the largest radial extent, would experience excessive radial load at operating temperature. Hence, it is necessary to size the O-ring 168 to accommodate all conditions of operation.

In this instance the O-ring 168 is configured for ambient temperature of 70° F. to define an internal circumference sufficient to expand slightly onto the second outer circumferential surface 156 of retainer 154. To avoid excessive radial compression within the pocket at operating temperature, 325° F., the diameter of the cross-section of the O-ring 168 is smaller at ambient temperature of 70° F. than the radial distance between first inner cylindrical surface 150 of primary ring 138 and second outer cylindrical surface 156 of retainer 154. As a result, on pressure reversal at ambient temperature, an effective secondary seal between the primary ring 138 and retainer 154 could not be assured. Conical ramp 161 on second outer cylindrical surface 156 of retainer 154 solves this problem.

In operation, barrier gas in chamber 26 is maintained at a pressure that exceeds the process pressure generated by the compressor operation. Shaft 16 and sleeve 32 rotate at operating speed rotating mating rings 36 and 136. The pumping mechanisms on the faces 40 and 140, in particular the spiral grooves exposed at the radial outer periphery of the interface of faces 40–42 and 140–142, pump barrier gas between the seal faces causing lift and resulting in non-contacting operation.

In the event of a loss of barrier gas pressure, the process pressure in chamber 18 exceeds the pressure in the barrier chamber 26. Because the radially inner spiral grooves 149 are exposed to the process gas and the inner periphery of the seal ring interface 140–142, process gas is pumped between the faces to provide lift and permit continued non-contacting operation of the inner seal ring set 22.

Secondary O-ring seals 45 and 68 in outboard seal ring set 24 separate the barrier gas chamber 26 from the surrounding environment 20. Secondary seals 145 and 168 in inboard seal ring set 22 separate the barrier gas chamber 26 from the process gas chamber 18.

In normal operation conditions, the barrier gas is at a pressure that exceeds the process gas pressure. The O-ring 168 is, therefore, urged toward radial sealing surface 153 in the O-ring seal pocket and seats against the radial sealing surface 153 of primary ring 138 and the second outer cylindrical surface 156 of retainer 154.

FIG. 4 is an enlarged sectional view of the seal sets. As illustrated in FIG. 4, a pressure reversal causes the O-ring 168 to be urged axially toward radial sealing surface 159 of retainer 154. To effect a sealing relationship, it is necessary that the O-ring 168 engage both the radial sealing surface 159 of retainer 154 and first inner cylindrical surface 150 of primary ring 138. At certain operating conditions, for example, ambient temperature of 70° F., the size of the outer circumference of O-ring 168 and the radial distance between second outer cylindrical surface 156 of retainer 154 and first inner cylindrical surface 150 of primary ring 138 are such that sealing engagement with first inner cylindrical surface 150 would not occur. Inclined conical ramp 161, however, causes the inner circumference of O-ring 168 to expand radially as the ring moves toward radial sealing surface 159 of retainer 154.

Process pressure, acting on O-ring 168, causes it to travel axially from second outer cylindrical surface 156 of retainer 154 to a position overlapping inclined conical ramp 161 where it is also pressed against radial sealing surface 159. The conical ramp causes the inner circumference of O-ring 168 to expand sufficiently to ensure sealing engagement of the outer circumferential periphery of the O-ring 168 with second inner cylindrical surface 150 of primary ring 138. The O-ring 168 also contacts the radial surface 159 of retainer 154 in sealing relation. Thus, even at ambient design temperature of 70° F., an effective secondary seal is accomplished which continues to separate the process chamber 18 from the barrier gas chamber 26.

Seal balance ratio is the ratio of the amount of force from fluid pressure acting on the back of the axially movable seal ring tending to close the faces divided by the forces between the faces tending to open them. It is measured by the ratio of areas exposed to such pressure causing such closing and opening forces.

It should be noted that in the seal of FIG. 1 the inboard seal set is configured to change the balance on pressure reversal, thereby maintaining a sufficient balance to ensure that the faces 140–142 remain in an operational relationship.

In this regard, under normal operation, the barrier gas pressure exceeds the process gas pressure. O-ring 168 is seated against second outer cylindrical surface 156 which determines the area of back face 152 of primary ring 138 exposed to pressure in the barrier chamber 26. The circumference of second outer cylindrical surface 156 is the balance diameter.

On a pressure reversal, O-ring 168 is urged against radial sealing surface 159 and first inner cylindrical surface 150 of primary ring 138. The balance diameter shifts to the circumference of first inner cylindrical surface 150 with those radial surfaces of primary ring 138 radially inward of the circumference representing the area subjected to the higher pressure of the process fluid. With such a shift in balance diameter, balance may be maintained at levels in excess of 0.5 regardless of the location of higher pressure.

Balance under normal conditions of a barrier gas pressure in excess of process pressure can be about 0.85. On reversal conditions, with the process pressure higher than the pressure in the barrier gas chamber 28, a balance can be about 0.65. It should be noted that balance in either direction can be increased by decreasing the diameter of the outer circumferential periphery of the interface 140–142 of rings 136–138.

The reverse pumping grooves 149 produce lift that counteracts the closing force and avoids damage to primary ring 138 and mating ring 136 due to hard contact on a pressure reversal. The grooves are sized to produce lift such that, on pressure reversal, the faces 140 and 142 operate with no contact or slight contact. Hard contact due to pressure reversal is avoided.

Figure 5:
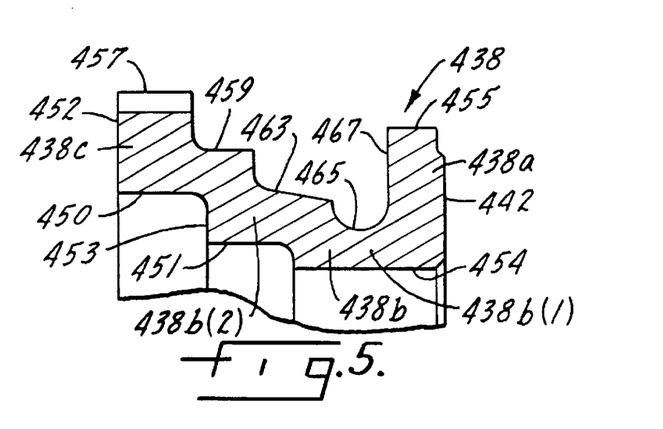
FIG. 5 is an elevational view, in section, of a preferred form of the primary ring of the inboard seal of the apparatus of FIG. 1.

As previously explained, the primary ring 138 of inboard seal set 22 is axially elongated with that portion 138*a* defining the radial sealing face 142 decoupled from that portion 138*c* supported on retainer 154. The intermediate portion 138*b* defines a flexible transition.

FIG. 5 is an enlarged sectional view and shows a cross-section of primary ring 438 illustrative of a preferred configuration for primary ring 138. It is a unitary ring made of a single bland of carbon material.

Ring 438 includes portion 438*a* that defines a radial sealing face 442 for relatively rotating sealing relation with a sealing face 140 of a mating ring 136. Axial extent of portion 438*a* between face 442 and a back wall 467 is about 17% of the total axial extent of the ring. It includes inner cylindrical surface 454 of a diameter smaller than second outer cylindrical surface 156 of retainer 154. It also includes an outer cylindrical surface 455.

Portion 438*c* defines first inner cylindrical surface 450 adapted to be supported on first outer cylindrical surface 155 of retainer 154. It includes outer cylindrical surface 457 having drive notches for engagement with lugs 157 of retainer 154. Axially, portion 438*c* extends about the same distance as the distance between back face 452 and radial sealing surface 453. It represents about 24% of the axial extent of the ring 438.

Radial sealing surface 453 extends radially outward from a second inner cylindrical surface 451 and connects to first inner cylindrical surface 450 by a fillet or radius. Second inner cylindrical surface 451 is adapted to be supported for axial translational movement on second outer cylindrical surface 156 of retainer 154 shown in FIG. 1. First inner cylindrical surface 450 is adapted to define an O-ring pocket with radial sealing surface 453, second outer cylindrical surface 156 of retainer 154 and a radial sealing surface 159 on the retainer such as illustrated in FIG. 1.

The axial outer portions 438*a* and 438*c* are connected by intermediate portion 438*b* which provides the flexibility necessary to structurally decouple the end portions. Intermediate portion 438*b* is about 40% of the axial extent of ring 438. It is comprised of two portions 438(1) adjacent portion 438*a*.

Portion 438*b*(2) comprises about 20% of the axial length of ring 438. It is defined by the inner cylindrical surface 451 which is adapted to be supported on second outer cylindrical surface 156 of retainer 154 and the radial sealing, surface 453. The diameter of second inner cylindrical surface 451 is larger than the diameter of inner cylindrical surface 454 of portion 438*a*. Portion 438*b*(2) includes an outer cylindrical surface 459 which is of a diameter smaller than the diameter of outer cylindrical surface 455 of portion 438*a*.

Portion 438*b*(1) is the most flexible portion of ring 438. It comprises about 40% of the axial extent of the ring 438.

It includes an inner cylindrical surface 461 having a diameter equal to the diameter of inner cylindrical surface 454 of portion 438a. The outer surface of portion 438b(1) is of a compound shape. It includes a conical surface 463 that extends from portion 438b(2) commencing at a diameter about equal to that of first inner cylindrical surface 450 at an angle radially inwardly of 11° to the horizontal to a semicircular groove 465 formed adjacent commencement of portion 438a. The radius of the groove is about 4% of the axial extent of ring 454.

The radial extent of the various portions of ring 438 in reference to the radial extent of portion 438a are as follows. The radial extent of portion 438c relative to the radial extent of portion 438a is 70%. The radial extent of portion 438b(2) relative to portion 438a is 66%. The radial extent of the portion 438b(1) at the groove 465 relative to the radial extent of portion 438a is 28%.

The ring 438 described above provides the strength necessary to operate at the pressures and temperatures experienced in the compressor environment and the flexibility to ensure that the surfaces of the relatively rotating faces of the inboard seal set remain parallel over the operating range. The portions 438a and 438c have relatively large mass to withstand these operational conditions. Portion 438b provides the requisite flexibility to the structure.

Seals have been manufactured incorporating the present invention. Two sizes have been made; for a 7.625 inch shaft and a 5.250 inch shaft.

For the 7.625 inch shaft size, the primary ring portion 438a defining the relatively rotatable sealing face 442 had an outer diameter of 8.572 inches. The seal ring interface 140–142 had an axial extent of 0.414 inches commencing at an outer circumferential diameter of 4.340 inches. Outer cylindrical surface 457 had a diameter of 8.852 inches. The surface 454 was 7.446 inches in diameter. The overall axial length of ring 454 was 1.250 inches. First inner cylindrical surface 450 had a diameter of 8.052 inches. Second inner cylindrical surface 451 had a diameter of 7.651 inches.

These seals were designed to experience a maximum process pressure of 200 psig (pounds per square inch gauge). The barrier gas pressure employed was 250 psig.

The O-ring 168 for the 7.625 inch seal had a cross-section of 0.205 to 0.215 inches. It had an inside circumferential diameter of 7.430 to 7.520 inches.

First outer cylindrical surface 155 had a diameter of 7.993 inches. The second outer cylindrical surface 156 had a diameter of 7.627 inches and a length of 0.513 inches including a 0.093 inch by 30° chamfer. The conical ramp 161 was 0.100 inches in axial extent.

Various features of the invention have been described in connection with the illustrated embodiment of the invention. Various modifications may be made without departing from the scope of the invention.

We claim:

1. A method of sealing between a housing containing a process fluid and a relatively rotating shaft utilizing a non-contacting seal assembly comprising a pair of spaced sets of relatively rotating rings defining an intermediate chamber to receive a barrier gas at a pressure exceeding process fluid pressure;

each said set including a non-rotatable ring and a rotatable ring, one of said rings being moveable axially relative to the other, each ring of each set defining a generally radial annular sealing face in relatively rotating sealing relation to the to the sealing face of the other ring of said set at a sealing interface;

one of said rings of at least one set having a pumping mechanism thereon and disposed between said interface to pump barrier gas toward the process fluid in the housing, the steps comprising:

providing a barrier gas in said intermediate chamber at a pressure in excess of the pressure of said process fluid, pumping barrier gas from said intermediate chamber between said interface when the pressure of the barrier gas exceeds the pressure of the process fluid;

pumping process fluid between said interface of said seal set when the process fluid pressure exceeds the pressure of the barrier gas;

wherein said pumping mechanism includes a pattern of spiral grooves and lands formed on the radial sealing face of said one ring of said set, said grooves are open to the intermediate chamber at one circumferential periphery of the interface between the relatively rotating sealing faces of said set, and terminate at an ungrooved area defining a sealing dam; and wherein the pumping mechanism on the face of said one of said rings of said set disposed to pump barrier gas toward the process fluid in the housing includes a pattern of oppositely directed spiral grooves and lands adapted for communication with the process fluid at the other circumferential periphery of said interface to pump in a direction opposite the pattern of spiral grooves open to said intermediate chamber, the steps further comprising utilizing said grooves to respectively pump said barrier gas and said process fluid;

wherein said set disposed to pump barrier gas toward said process fluid includes a retainer to support said axially moveable ring for axial translation thereon, said retainer and said ring defining an axially elongated annular pocket therebetween; an O-ring seal disposed in said pocket; said O-ring being sized such that it has a cross-sectional diameter that is smaller than both the axial and radial extent of the pocket; the steps further comprising providing a secondary seal between said axially moveable ring and said retainer utilizing said O-ring;

wherein said retainer includes an outer cylindrical sealing surface forming part of said pocket and supporting said O-ring thereon and a radial sealing surface forming an axial end of said pocket, said retainer further including a conical ramp extending radially outward between said cylindrical sealing surface and said radial sealing surface, said O-ring being moveable from a position on said cylindrical sealing surface of said retainer to a position on said conical ramp in sealing contact with said radial sealing surface of said retainer; the steps further comprising providing said secondary seal with said O-ring on said outer cylindrical surface when said barrier gas pressure exceeds the pressure of said process fluid, and providing said secondary seal with said O-ring on said conical ramp when said process fluid pressure exceeds the pressure in said intermediate chamber.

2. A method of sealing as claimed in claim 1 wherein said ring supported on said retainer includes an inner cylindrical sealing surface overlying said outer cylindrical sealing surface of said retainer and defining a part of said annular pocket, said ring further includes a radial sealing surface spaced from said radial sealing surface of said retainer to further define said annular pocket, said O-ring being positionable in sealing contact with said radial sealing surface of said ring when positioned on said outer cylindrical sealing surface of said retainer and being positionable in sealing contact with said inner cylindrical surface of said ring when positioned on said conical ramp in sealing relation to said radial sealing surface of said retainer the steps further comprising positioning said O-ring on said outer cylindrical surface of said retainer in contact with said radial sealing surface of said ring when the pressure of the barrier gas exceed the pressure of the process fluid and positioning said O-ring on said control ramp in sealing contact with said radial sealing surface of said retainer and said inner cylindrical sealing surface of said ring when the pressure of the process fluid exceeds the pressure of the barrier gas.

3. A non-contacting seal assembly to seal between a housing containing a process fluid and a relatively rotating shaft, said assembly comprising a pair spaced sets of relatively rotating rings defining an intermediate chamber to receive a barrier gas at a pressure exceeding process fluid pressure;

each said set including a non-rotatable ring and a rotatable ring, one of said rings being moveable axially relative to the other, each ring of each set defining a generally radial annular sealing face in relatively rotating sealing relation to the sealing face of the other ring of said set at a sealing interface;

one of said rings of at least one set having a pumping mechanism thereon arranged to pump barrier gas from said intermediate chamber between said interface;

said one of said sets adapted to be disposed to pump barrier gas toward the process fluid, said set including a retainer to support said axially moveable ring for axial translation thereon, said retainer and said ring defining an axially elongated annular pocket therebetween;

an O-ring seal disposed in said pocket; said O-ring being sized such that it has a cross-sectional diameter that is smaller than both the axial and radial extent of the pocket, said O-ring providing a secondary seal between said axially moveable ring and said retainer;

wherein said retainer includes an outer cylindrical sealing surface forming part of said pocket and supporting said O-ring thereon and a radial sealing surface forming an axial end of said pocket, said retainer further including a conical ramp extending radially outward between said cylindrical sealing surface and said radial sealing surface, said O-ring being moveable from a position on said cylindrical sealing surface of said retainer to a position on said conical ramp in sealing contact with said radial sealing surface of said retainer.

4. A non-contacting seal assembly as claimed in claim 3 wherein said ring supported on said retainer includes an inner cylindrical sealing surface overlying said outer cylindrical sealing surface of said retainer and defining a part of said annular pocket, said ring further includes a radial sealing surface spaced from said radial sealing surface of said retainer to further define said annular pocket, said O-ring being positionable in sealing contact with said radial sealing surface of said ring when positioned on said outer cylindrical sealing surface of said retainer and being positionable in sealing contact with said inner cylindrical surface of said ring when positioned on said conical ramp in sealing relation to said radial sealing surface of said retainer.

5. A non-contacting seal assembly as claimed claim 4 wherein said O-ring has a cross-sectional diameter that is smaller than the radial extent of the pocket, at an ambient design temperature of 70 degrees F., and, wherein, the inner peripheral surface of said O-ring is in contact with said outer cylindrical sealing surface of said retainer at said design temperature.

6. A non-contacting seal assembly as claimed in claim 5 wherein said O-ring overlies said conical ramp in contact with said radial sealing surface of said retainer and said cylindrical sealing surface of said ring when the pressure of the process fluid exceeds the pressure in the intermediate chamber.

7. A non-contacting seal assembly as claimed in claim 5 wherein said O-ring is in contact with said outer cylindrical sealing surface of said retainer and said radial sealing surface of said ring when the barrier gas pressure exceeds the pressure of the process.

8. A non-contacting seal assembly as claimed in claim 7 wherein said O-ring overlies said conical ramp in contact with said radial sealing surface of said retainer and said cylindrical sealing surface of said ring when the pressure of the process fluid exceeds the pressure in the intermediate chamber.

9. A non-contacting seal assembly as claimed in claim 4 wherein said O-ring is in contact with said outer cylindrical sealing surface of said retainer and said radial sealing surface of said ring when the barrier gas pressure exceeds the pressure of the process.

10. A non-contacting seal assembly as claimed in claim 9 wherein said O-ring overlies said conical ramp in contact with said radial sealing surface of said retainer and said cylindrical sealing surface of said ring when the pressure of the process fluid exceeds the pressure in the intermediate chamber.

11. A non-contacting seal assembly as claimed in claim 4 wherein said O-ring overlies said conical ramp in contact with said radial sealing surface of said retainer and said cylindrical sealing surface of said ring when the pressure of the process fluid exceeds the pressure in the intermediate chamber.

12. A non-contacting seal assembly as claimed in claim 3 wherein said O-ring is in contact with said outer cylindrical sealing surface of said retainer when the barrier gas pressure exceeds the pressure of the process fluid.

13. A non-contacting seal assembly as claimed in claim 12 wherein said O-ring overlies said conical ramp in contact with said radial sealing surface of said retainer and said cylindrical sealing surface of said ring when the pressure of the process fluid exceeds the pressure in the intermediate chamber.

14. A non-contacting seal assembly as claimed in claim 12 wherein the pumping mechanism includes a pattern of spiral grooves and lands formed on the radial sealing face of said one ring of said set, said grooves are open to the intermediate chamber at one circumferential periphery of the interface between the relatively rotating sealing faces of said set, and terminate at an ungrooved area defining a sealing dam.

15. A non-contacting seal assembly as claimed in claim 14 wherein the pumping mechanism on the face of said one of said rings of said set includes a pattern of oppositely directed spiral grooves and lands adapted for communication with the process at the other circumferential periphery of said interface to pump in a direction opposite the pattern of spiral grooves open to said intermediate chamber.

16. A non-contacting seal assembly as claimed in claim 15 wherein said oppositely directed pattern of grooves and lands include one groove for every other groove of said pattern open to said intermediate chamber.

17. A non-contacting seal assembly as claimed in claim 16 wherein said pattern of oppositely directed grooves has a radial extent that is less than the radial extent of the pattern of spiral grooves open to said intermediate chamber, said patterns defining an ungrooved dam between them.

18. A non-contacting seal assembly as claimed in claim 17 wherein the depth of the grooves of said reverse pumping grooves is less than the depth of said grooves open to said intermediate chamber.

19. A non-contacting seal assembly as claimed in claim 18 wherein said reverse pumping grooves are one half of the circumferential extent of the associated land and the grooves open to said intermediate chamber are equal in circumferential extent to the associated land.

20. A non-contacting seal assembly as claimed in claim 19 wherein said reverse pumping grooves have a radial extent that is about 21 to 24% of the radial extent of said interface between said relatively rotating sealing faces and said grooves open to said intermediate chamber span about 55 to 60% of the radial extent of said interface.

21. A non-contacting seal assembly as claimed in claim 13 wherein the pumping mechanism includes a pattern of spiral grooves and lands formed on the radial sealing face of said one ring of said set, said grooves are open to the intermediate chamber at one circumferential periphery of the interface between the relatively rotating sealing faces of said set, and terminate at an ungrooved area defining a sealing dam.

22. A non-contacting seal assembly as claimed in claim 21 wherein the pumping mechanism on the face of said one of said rings of said set includes a pattern of oppositely directed spiral grooves and lands adapted for communication with the process at the other circumferential periphery of said interface to pump in a direction opposite the pattern of spiral grooves open to said intermediate chamber.

23. A non-contacting seal assembly as claimed in claim 22 wherein said oppositely directed pattern of grooves and lands include one groove for every other groove of said pattern open to said intermediate chamber.

24. A non-contacting seal assembly as claimed in claim 23 wherein said pattern of oppositely directed grooves has a radial extent that is less than the radial extent of the pattern of spiral grooves open to said intermediate chamber, said patterns defining an ungrooved dam between them.

25. A non-contacting seal assembly as claimed in claim 24 wherein the depth of the grooves of said reverse pumping grooves is less than the depth of said grooves open to said intermediate chamber.

26. A non-contacting seal assembly as claimed in claim 25 wherein said reverse pumping grooves are one half of the circumferential extent of the associated land and the grooves open to said intermediate chamber are equal in circumferential extent to the associated land.

27. A non-contacting seal assembly as claimed in claim 26 wherein said reverse pumping grooves have a radial extent that is about 21 to 24% of the radial extent of said interface between said relatively rotating sealing faces and said grooves open to said intermediate chamber span about 55 to 60% of the radial extent of said interface.

28. A non-contacting seal assembly as claimed in claim 3 wherein the pumping mechanism includes a pattern of spiral grooves and lands formed on the radial sealing face of said one ring of said set, said grooves are open to the intermediate chamber at one circumferential periphery of the interface between the relatively rotating sealing faces of said set, and terminate at an ungrooved area defining a sealing dam.

29. A non-contacting seal assembly as claimed in claim 28 wherein the pumping mechanism on the face of said one of said rings of said set includes a pattern of oppositely directed spiral grooves and lands adapted for communication with the process fluid at the other circumferential periphery of said interface to pump in a direction opposite the pattern of spiral grooves open to said intermediate chamber.

30. A non-contacting seal assembly as claimed in claim 29 wherein said oppositely directed pattern of grooves and lands include one groove for every other groove of said pattern open to said intermediate chamber.

31. A non-contacting seal assembly as claimed in claim 30 wherein said pattern of oppositely directed grooves has a radial extent that is less than the radial extent of the pattern of spiral grooves open to said intermediate chamber, said patterns defining an ungrooved dam between them.

32. A non-contacting seal assembly as claimed in claim 31 wherein the depth of the grooves of said reverse pumping grooves is less than the depth of said grooves open to said intermediate chamber.

33. A non-contacting seal assembly as claimed in claim 32 wherein said reverse pumping grooves are one half of the circumferential extent of the associated land and the grooves open to said intermediate chamber are equal in circumferential extent to the associated land.

34. A non-contacting seal assembly as claimed in claim 33 wherein the radial extent of said reverse pumping grooves is about 21 to 24% of the radial extent of said interface between said relatively rotating sealing faces and said grooves open to said intermediate chamber span about 55 to 60% of the radial extent of said interface.

35. A non-contacting seal assembly as claimed in claim 3 wherein said axially moveable ring of said set adapted to pump barrier gas toward the process fluid includes a first portion defining said radially directed sealing face, a second portion supporting said ring for axial movement, and an intermediate portion configured to decouple said first and second portions to ensure a parallel relationship between said relatively rotating sealing faces under varying conditions of operating pressure and temperature.

36. A non-contacting seal assembly as claimed in claim 35 wherein said intermediate portion includes a portion having a radial extent that is less than the radial extent of said first and second portions.

37. A non-contacting seal assembly as claimed in claim 36 wherein said intermediate portion defines an annular groove adjacent said first portion to provide said flexibility of said intermediate portion to decouple said first and second portions.

38. A non-contacting seal assembly as claimed in claim 3 wherein the pumping mechanism includes a pattern of spiral grooves and lands formed on the radial sealing face of said one ring of said set, said grooves are open to the intermediate chamber at one circumferential periphery of the interface between the relatively rotating sealing faces of said set, and terminate at an ungrooved area defining a sealing dam.

39. A non-contacting seal assembly as claimed in claim 38 wherein the pumping mechanism on the face of said one of said rings of said set includes a pattern of oppositely directed spiral grooves and lands adapted for communication with the process at the other circumferential periphery of said interface to pump in a direction opposite the pattern of spiral grooves open to said intermediate chamber.

40. A non-contacting seal assembly as claimed in claim 39 wherein said oppositely directed pattern of grooves and lands include one groove for every other groove of said pattern open to said intermediate chamber.

41. A non-contacting seal assembly as claimed in claim 40 wherein said pattern of oppositely directed grooves has a radial extent that is less than the radial extent of the pattern of spiral grooves open to said intermediate chamber, said patterns defining an ungrooved dam between them.

42. A non-contacting seal assembly as claimed in claim 41 wherein the depth of the grooves of said reverse pumping grooves is less than the depth of said grooves open to said intermediate chamber.

43. A non-contacting seal assembly as claimed in claim 42 wherein said reverse pumping grooves are one half of the circumferential extent of the associated land and the grooves open to said intermediate chamber are equal in circumferential extent to the associated land.

44. A non-contacting seal assembly as claimed in claim 43 wherein said reverse pumping grooves have a radial extent that is about 21 to 24% of the radial extent of said interface between said relatively rotating sealing faces and said grooves open to said intermediate chamber span about 55 to 60% of the radial extent of said interface.

45. A non-contacting seal assembly as claimed in claim 3 wherein said O-ring overlies said conical ramp in contact with said radial sealing surface of said retainer when the pressure of the process fluid exceeds the pressure in the intermediate chamber.

* * * * *